United States Patent
Smith

(10) Patent No.: US 6,279,182 B1
(45) Date of Patent: Aug. 28, 2001

(54) SLEEPING BAG WITH INTERNAL RIGID FRAME OPENING

(76) Inventor: Barbara Smith, 362 Serramonte Terr., Fremont, CA (US) 94536

( * ) Notice: Subject to any disclaimer, the term of this patent is extended or adjusted under 35 U.S.C. 154(b) by 0 days.

(21) Appl. No.: 09/609,264

(22) Filed: Jun. 30, 2000

(51) Int. Cl.[7] ........................................ A47G 9/08
(52) U.S. Cl. .................................. 5/413 R; 5/414
(58) Field of Search ........................... 5/413 R, 414, 5/505.1, 506.1, 504.1; 135/95, 120.1

(56) References Cited

U.S. PATENT DOCUMENTS

| | | | | |
|---|---|---|---|---|
| 2,974,328 | * | 3/1961 | Hebberd ................................ | 5/505.1 |
| 3,050,747 | * | 8/1962 | Uhl ........................................ | 5/505.1 |
| 3,860,980 | * | 1/1975 | Ebert ..................................... | 5/413 R |
| 4,232,692 | * | 11/1980 | Atkins .................................. | 5/414 X |
| 5,203,042 | * | 4/1993 | Mason .................................. | 5/504.1 |

* cited by examiner

Primary Examiner—Michael F. Trettel
(74) Attorney, Agent, or Firm—Gregory Smith & Associates

(57) ABSTRACT

A sleeping bag or other sleeping apparatus having a rigid opening means or rigid expanded portion means for providing a rigid mechanical framework for supporting the top/upper layer of the sleeping apparatus or sleeping bag in order to extend and maintain the top/upper layer a predetermined distance away from the bottom layer of the sleeping apparatus or sleeping bag. The rigid opening or expansion portion extends for a predetermined longitudinal length into or through the sleeping apparatus/sleeping bag at any desired location. Such a rigid tunnel-like opening for disposed at the entrance of a sleeping bag would be desirable to provide a non-threatening, inviting entrance for a pet. Such a rigid tunnel-like opening, when disposed at a predetermined location any where along the longitudinal length of a sleeping bag or other sleeping apparatus would serve to prevent the sleeping bag cloth material from irritating a sensitive, injured or irritated body part or appendage of the human or pet occupant.

5 Claims, 2 Drawing Sheets

SLEEPING BAG WITH INTERNAL RIGID FRAME OPENING

BACKGROUND OF THE INVENTION

1. Field of the Invention

The invention relates in general to a sleeping bag or other sleeping apparatus for either human or pet habitation and in particular to such a sleeping bag having a rigid framework which may be disposed at the front entrance of the sleeping bag to provide a tunnel-like entrance opening to the sleeping bag.

2. Discussion of the Relevant Art

The use of sleeping bags for both humans and pets is well known. Likewise folding portable beds are well known. U.S. Pat. No. 4,893,586 is directed to a fabric sleeping bag for pets that has the top and bottom layer that are sown together to define a permanent soft opening for entry of the pet. U.S. Pat. No. 5,611,414 is directed to a suitcase having a foldable mattresses and bed clothing inside. U.S. Pat. No. 5,655,237 is directed to an air controlled comforter that provides controlled humidity and temperature within the interior. U.S. Pat. No. 5,765,502 is directed to a pet bed having a removable cushion and a removable bolster to form a sleeping pad for a pet. U.S. Pat. No. 5,742,911 is directed to a cat cushion formed of a plurality of layers of unwoven polyester.

While the above pet sleeping apparatus and folding bed apparatus may be and probably are suitable for their intended purposes, none of the references of the relevant art addresses how to provide or maintain a rigid opening or rigid expanded portion of the sleeping apparatus and certainly do not address how to provide such a rigid opening or expansion to a predetermined longitudinal length/depth through the sleeping apparatus. Such a rigid tunnel-like opening for a sleeping bag would be desirable to provide a non-threatening, inviting entrance for a timed or wary pet. Most pets cannot enter a sleeping bag type structure without assistance from a human, because they cannot open the entrance by themselves.

Likewise such a longitudinal length expansion or opening for a sleeping bag would have other desirable applications and children and adult benefits such as a conversation opening for a slumber party sleeping bag i.e. place all the rigid tunnel opening sleeping bags in a circle with the tunnel openings facing the interior of the circle so the participant/invitees may conduct uninhibited conversation while reclining, propped up or even sitting upright within their respective openings (depending on the size of the respective tunnel openings).

Accordingly, it would be desirable to have a rigid opening or rigid expanded portion of the entrance of a sleeping apparatus or sleeping bag. It would further be desirable for the rigid opening or expansion to extend for a predetermined longitudinal length/depth into or through the sleeping apparatus. Such a rigid tunnel-like opening for a sleeping bag would be desirable to provide a non-threatening, inviting entrance for a pet as well as child/adult applications/usefullness.

SUMMARY OF THE INVENTION

Briefly, the present invention is a sleeping bag or other sleeping apparatus having a rigid opening means or rigid expanded portion means for providing a rigid mechanical framework for supporting the top/upper layer of the sleeping apparatus or sleeping bag in order to extend and maintain the top/upper layer a predetermined distance away from the bottom layer of the sleeping apparatus or sleeping bag. The rigid opening or expansion portion extends for a predetermined longitudinal length into or through the sleeping apparatus/sleeping bag at any desired location. Such a rigid tunnel-like opening disposed at the entrance of a sleeping bag would be desirable to provide a non-threatening, inviting entrance for a pet. Such a rigid tunnel-like opening, when disposed at a predetermined location anywhere along the longitudinal length of a sleeping bag or other sleeping apparatus would serve to prevent the sleeping bag cloth material from irritating a sensitive, injured or irritated body part or appendage of the human or pet occupant. A preferred embodiment of the invention has a cloth outer covering on the exterior or the rigid frame and cloth bedding/sleeping bag material disposed on the interior of the rigid frame. A cloth cover having one or more cloth pockets is disposed on either end of the longitudinal frame and attaches to the cloth covering on the exterior of the frame so that the bedding/sleeping bag may be folded inside the frame and then the outer end covers attached to provide a compact box container. A handle is disposed on the topside of the frame top surface to provide ease of lifting and handling for transport.

BRIEF DESCRIPTION OF THE DRAWINGS

The invention may be understood and further advantage and uses thereof more readily apparent, when considered in view of the following detailed description of the exemplary embodiments, taken with the accompanying drawings, in which.

DESCRIPTION OF THE PREFERRED EMBODIMENTS

Figure 1:
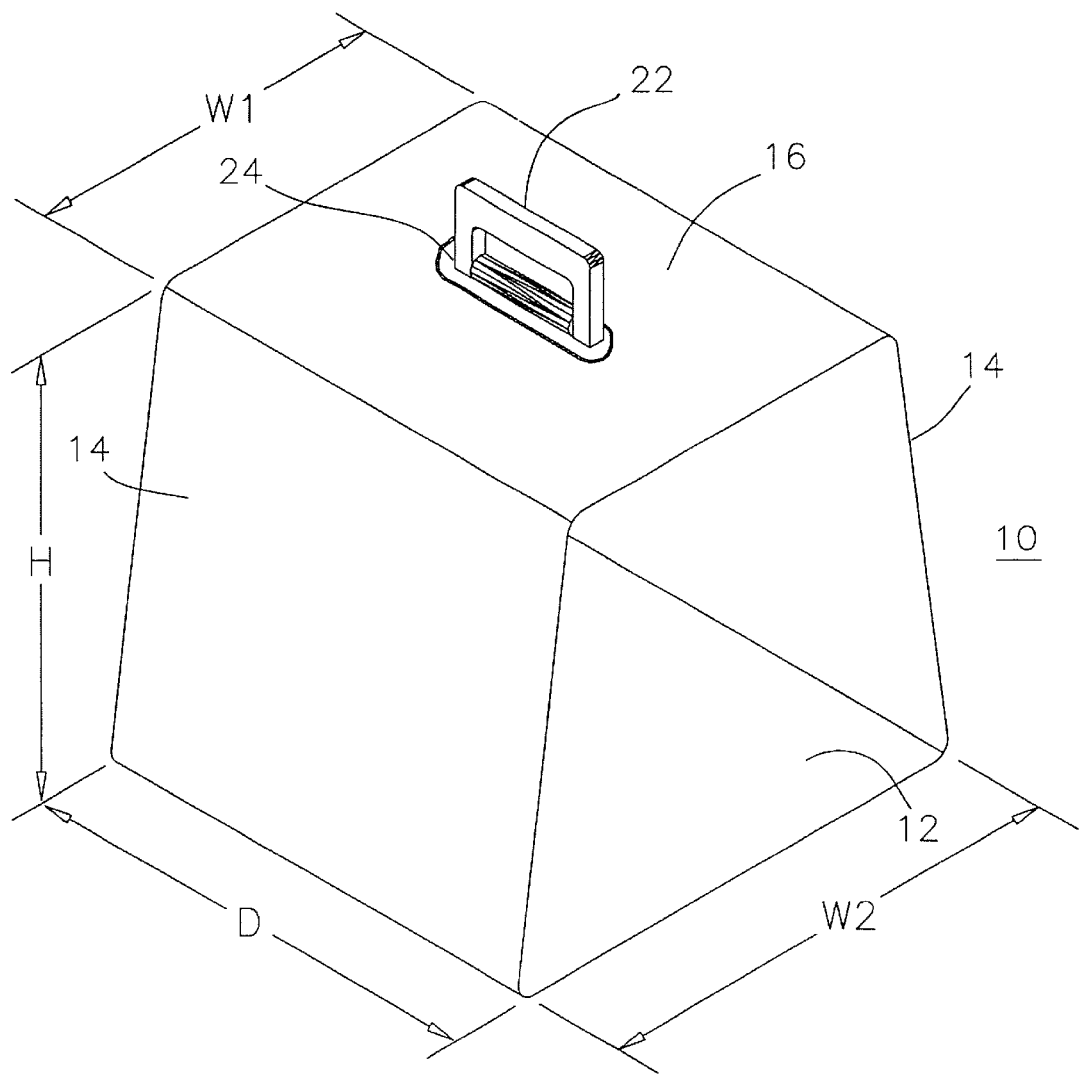
FIG. 1 is an isometric view of the rigid frame constructed according to the teachings of the invention.

Referring now to the drawings and to FIG. 1 in particular there is shown an isometric view of the rigid frame 10 constructed according to the teachings of the invention. Rigid frame 10 includes a base/floor 12, two sides/sidewalls 14 and a top/ceiling/covering 16, respectively. Although rigid frame 10 has a trapezoidal geometric shape because the width W1 of top 16 is somewhat shorter that the width W2 of the base 12, other geometric shapes for instance square and rectangle will work just as well without departing from the teachings of the invention. The trapezoidal shape was selected for the preferred embodiment because this shape had the most stability of all those considered. The trapezoidal shape was selected also because it economized material, was pleasing to the eye, had good ergonomics, transportation clearances and was inviting to the occupants that the one of the many variations of the invention was developed for, i.e. pets and small children. The important dimensions of rigid frame 10 is the size of the width of the base W2, and the height H and the depth D of the sidewalls 14. This W2 and D and H determine the size of the tunnel opening of the rigid opening means or rigid expanded portion means for providing a rigid mechanical framework for supporting the top/upper layer of the sleeping apparatus or sleeping bag in order to extend and maintain the top/upper layer a predetermined distance away from the bottom layer of the sleeping apparatus or sleeping bag 50 (to be described infra). Also shown in FIG. 1 is handle 22 which is disposed on rigid frame 10 by way of attachment means 24 which may be any suitable means such as screws, anchors, brackets, glue etc.

Figure 2:
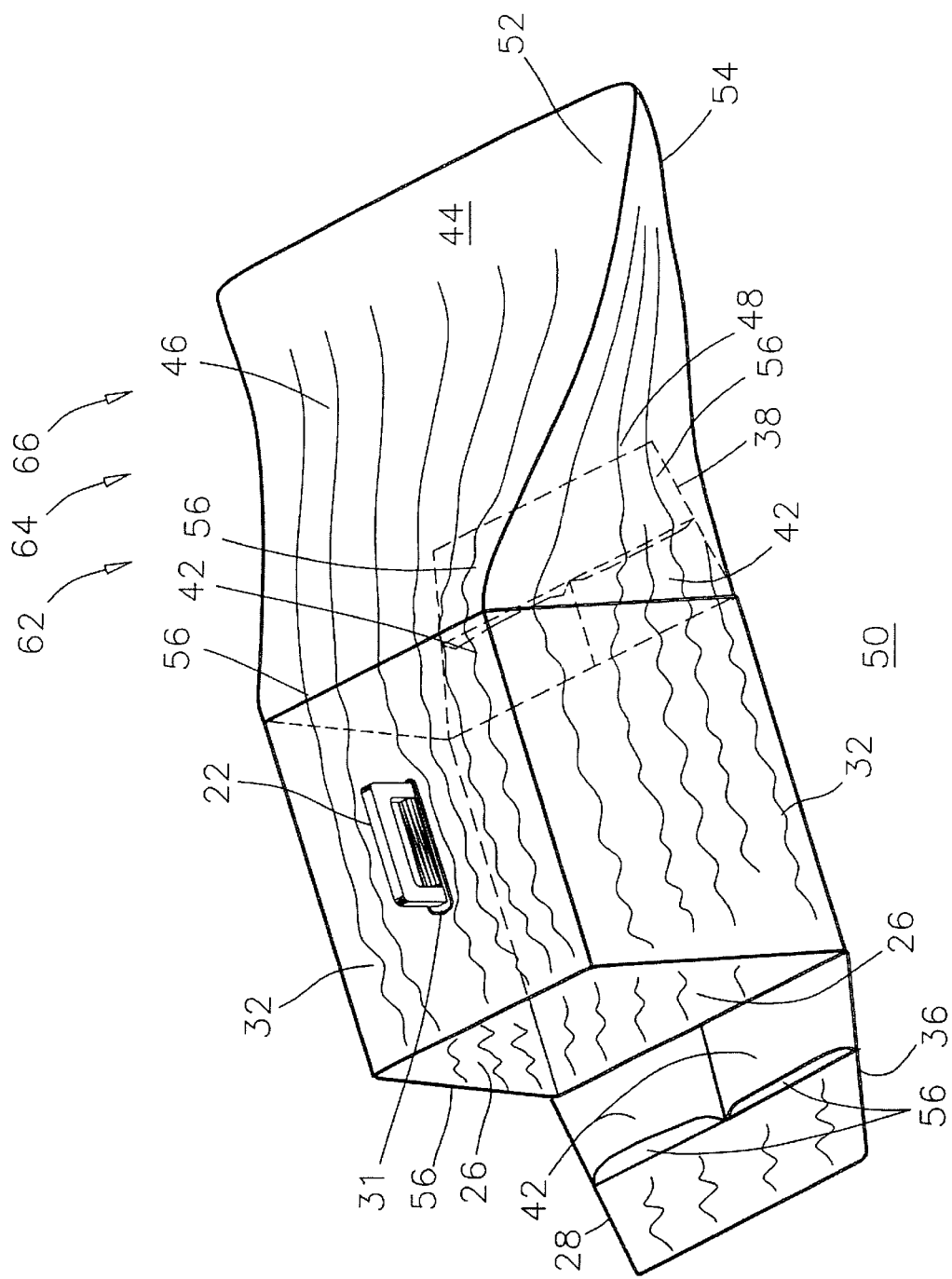
FIG. 2 is the isometric view of the rigid frame of FIG. 1 illustrating the exterior and interior bedding coverings and end flap cloth coverings disposed on the rigid frame of FIG. 1, all constructed according to the teachings of the invention.

Referring now to FIG. 2 there is shown the isometric view of the rigid frame of FIG. 1 now covered with the fabric bed covers of a sleeping bag to provide a Framed Compact Sleeping Transportable Apparatus 50 illustrating the exterior and interior bedding coverings 32 and 26 respectively and end flap cloth coverings 36,38 respectively disposed on the rigid frame of FIG. 1, all constructed according to the teachings of the invention. Framed Apparatus 50 includes exterior cloth covering 32 having formed handle opening 31 so that handle 22 may protrude out of exterior cloth covering 32. Framed sleeping apparatus 50 further includes interior cloth covering 26 and front and rear flaps 36,38 respectively with pockets 42, which front and rear flaps 36,38 are usually made of cloth and may or may not have a solid reinforcement layer. Framed sleeping apparatus 50 further includes sleeping bag 44 including top cloth or bedding layer 46 and bottom cloth or bedding layer 48. Both top cloth or bedding layer 46 and bottom cloth or bedding layer 48 have an outside and an inside cover 52, 54 respectively with either or both padding and insulation disposed therebetween.

Interior cloth covering 26 may be connected to inside cover 54 or both interior cloth covering 26 and inside cover 54 may be made of one padded and/or insulated cloth bedding layer. Likewise exterior cloth covering 32 may be connected to outside cover 52 or both exterior cloth covering 32 and outside cover 52 may be made of one padded and/or insulated cloth bedding layer. Both front and rear flaps 36,38 respectively and exterior cloth cover 32 may have disposed on them in a cooperative arrangement an attachment means 56 such as for example a zipper or hook and loop strips or snaps for closing front and rear flaps 36,38 into one unified framed sleeping apparatus 50, after of course sleeping bag 44 has been stuffed inside. Likewise pockets 42 and interior cloth covering 26 may have disposed on them a similar attachment means 56 in a cooperating arrangement to close up pockets 42 and/or close interior cloth covering 26 to exterior cloth covering 32.

It can readily be appreciated that although fixed frame 10 is shown disposed at the front of sleeping apparatus 50, it could have been disposed at any position along the length of sleeping apparatus 50 such as is shown at arrows 62,64,66, respectively, position 66 being shown located at the very rear of sleeping apparatus 50.

I claim:

1. A rigid frame for use with a sleeping bag or other sleeping apparatus comprising:
    a sleeping bag or other sleeping apparatus having a top and a bottom cover,
    a base, two opposing side walls and a top or roof all formed of a rigid material that when inserted in between the top and the bottom cover of said sleeping bag or other sleeping apparatus provides for raising said top cover up and away from said bottom cover.

2. The rigid frame for use with a sleeping bag or other sleeping apparatus of claim 1, wherein each of the base, two opposing side walls and the top or roof extend to a predetermined depth to form a tunnel-like structure.

3. A sleeping bag having a rigid frame disposed at a predetermined position along the length of said sleeping bag, comprising:
    a) a sleeping bag having a front, a top side and a bottom side, each of said top side and said bottom side being made with two cloth layers, an outside layer and an inside layer;
    b) a rigid frame having a base, two opposing side walls and a top or roof all formed of a rigid material that is inserted in between the outside and inside layers of each of said top and bottom side of said sleeping bag to provide for raising said top side up away from said bottom side of said sleeping bag and to provide a completely covered rigid frame.

4. The sleeping bag having a rigid frame disposed at a predetermined position along the length of said sleeping bag of claim 3 wherein the rigid frame has a predetermined length and is disposed at the front of the sleeping bag to provide a tunnel opening.

5. The sleeping bag having a rigid frame disposed at a predetermined position along the length of said sleeping bag of claim 3 wherein the rigid frame has a predetermined length and is disposed along the length of the sleeping bag to provide a separated opening along the length of the sleeping bag to prevent the sleeping bag material from touching the occupant of the sleeping bag at a predetermined location within the sleeping bag.

* * * * *